United States Patent
Kathail (10) Patent No.: US 7,162,537 B1
(45) Date of Patent: Jan. 9, 2007

(54) METHOD AND SYSTEM FOR EXTERNALLY MANAGING ROUTER CONFIGURATION DATA IN CONJUNCTION WITH A CENTRALIZED DATABASE

(75) Inventor: Pradeep Kathail, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/479,607

(22) Filed: Jan. 6, 2000

(51) Int. Cl.
  *G06F 15/173* (2006.01)
  *G06F 7/00* (2006.01)
  *H04L 12/28* (2006.01)
(52) U.S. Cl. .................. 709/238; 370/351; 707/10; 707/102
(58) Field of Classification Search ........... 707/1–2; 709/223, 238, 239, 242–244
  See application file for complete search history.

(56) References Cited

U.S. PATENT DOCUMENTS

| | | | | |
|---|---|---|---|---|
| 5,634,010 A | * | 5/1997 | Ciscon et al. ............... | 709/223 |
| 5,909,686 A | * | 6/1999 | Muller et al. ............ | 707/104.1 |
| 6,032,194 A | * | 2/2000 | Gai et al. .................... | 709/239 |
| 6,119,129 A | * | 9/2000 | Traversat et al. ........... | 707/202 |
| 6,226,644 B1 | * | 5/2001 | Ciscon et al. ................. | 707/10 |
| 2002/0021675 A1 | * | 2/2002 | Feldmann ................... | 370/254 |

OTHER PUBLICATIONS

Rekhter, Y. and Li, T. "Request for Comments 1771: A Border Gateway Protocol 4 (BGP-4)", published by Network working Group, Mar. 1995.*

* cited by examiner

*Primary Examiner*—David Wiley
*Assistant Examiner*—George C. Neurauter, Jr.
(74) *Attorney, Agent, or Firm*—Sierra Patent Group, Ltd.

(57) ABSTRACT

A method and system for externally managing router configuration data in conjunction with a centralized database subsystem in a router device. The centralized database provides external management registration and unregistration for various managing router subsystems associated with said database system. The centralized database and the subsystems registered for external data management engage in transaction request sequences to provide router data requested by other client subsystems. The arrangement of the various client subsystems associated with the database subsystem allows the client subsystems to remain modular and independent of each other.

22 Claims, 8 Drawing Sheets

METHOD AND SYSTEM FOR EXTERNALLY MANAGING ROUTER CONFIGURATION DATA IN CONJUNCTION WITH A CENTRALIZED DATABASE

BACKGROUND OF THE INVENTION

1. Field of the Invention

This invention pertains generally to internetwork router operating systems. More particularly, the invention is a method and system for managing data externally in a centralized database system for a router operating system.

2. The Prior Art

In a routing device, internetwork operating systems (IOS) or more commonly, router operating systems (OS), provide the basic command functions for the routing device as well as various subsystem components which provide specific functions or routines provided by the routing device.

In general, routing devices carry out the operation of reliably transferring network messages or packets between a network of coupled devices, or a collection of such networks. A reliable transfer protocol is provided by the IOS for carrying out such operation. Additionally, an interface in communication with a Configuration (config) subsystem is provided which allows a user of the routing device to configure the operations of the routing device.

The user may configure, for example, the IP address of an Ethernet interface facility or the default route for the routing device. A config command issued by the user is received by the config subsystem and processed therein. The config subsystem determines from the config command issued by the user which client subsystem is affected by configuration information contained in the config command. The config subsystem then carries out a communication exchange with the affected client subsystem to deliver the change in configuration information.

However, router devices typically include a plurality of client subsystems which manage specific functions, requiring multiple dependencies between the config subsystem and such client subsystems. Furthermore, client subsystems often have multiple dependencies with other client subsystem. For example, the PPP subsystem is dependent upon the IP subsystem for Internet address information and the AAA subsystem for user authentication and credential information. These and other subsystem dependencies as is known in the art prevent modularity in subsystem design and implementation within the IOS of the router.

Another drawback with current subsystem implementation schemes arises when temporary configuration changes to a subsystem are to be carried out. A temporary change is desired when, for example, a user of the routing device wishes to test a particular configuration to analyze the efficiency of such configuration, but would like the opportunity to subsequently revert or "back-out" of the change if desired. During such a configuration sequence, multiple transactions will typically need to be carried out between various subsystems. For example, where a user configures the IP address of an Ethernet facility port, the config subsystem will communicate the new IP address to the IP subsystem. In turn, the IP subsystem will communicate to the Ethernet subsystem that Ethernet facility port has new IP address information. When the changes are to be aborted or otherwise reverted, a similar chain of communication is necessary to complete the task of reverting prior changes. Such multiple dependencies between the various subsystems of the IOS make common transactions cumbersome and unnecessarily complicated. Furthermore, design and development of the various subsystems of the IOS must take into account these multiple dependencies requiring longer design and development time.

Another situation where a temporary change is desired is when a user connects to the router via a "dial-in" connection port. Dial-in connections are provided by a plurality of subsystem of the IOS. Certain default settings may be configured for most users. However, specialized settings may be configured for certain users, such as network administrators who have particular access privileges, for example. Where a user connects via a dial-in connection, a dialer subsystem communicates with an AAA subsystem to provide name and password information. Responsive to this communication, the AAA subsystem determines the access credentials of the dial-in user from the name and password information and communicates with a PPP subsystem. The access credentials provide, among other things, the configurations for the user at the dial-in connection port. The PPP subsystem then sets the port configurations for the user according to the user's access credentials thereby enabling point-to-point communication for the user.

When the user disconnects, the PPP subsystem, the AAA subsystem and the dialer subsystem need to communicate with each other to restore default settings. This situation presents another illustration where multiple dependencies between the various subsystems of the IOS make common transactions cumbersome and unnecessarily complicated.

Yet another disadvantage with current IOS transaction methods arises when a configuration command issued by a remote user of the routing device causes the user to be disconnected. Such configuration commands while not permanent prevent the user from remotely reconnecting to the routing device to correct the configuration. Normally, the user would need to directly interface with the routing device to correct the configuration, or otherwise manually restart or "reboot" the routing device to discard the current configuration and restore the previous configuration. Current transaction methods do not provide a facility or method for sensing such disconnection events and for restoring the previous connection upon the discovery of such disconnection.

Copending application entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, describes a method and system for transacting routing device configurations using a centralized information provider or database system and is incorporated herein by reference. In this copending application, a centralized database system (sysDB) is provided within the IOS which manages transactions on router configuration data. The sysDB receives configuration commands from various IOS subsystems. Such commands may include, for example, a request to change configuration data and a request to revert changes made to the configuration data. Use of the sysDB allows the system to be modular and avoid unnecessary dependencies between subsystem components.

However, the centralized database scheme is somewhat inefficient when the information stored in the database contains a large amount of data or is changing very fast. For example, when the data in the database is constantly changing (such as statistic counters), the sysDB may have to continuously perform transaction routines, notification routines, and verification routines. The verification routine is described in further detail in copending application entitled METHOD AND SYSTEM FOR VERIFYING CONFIGURATION TRANSACTIONS MANAGED BY A CEN- TRALIZED DATABASE filed on Oct. 12, 1999 which is incorporated by reference herein. The notification routine is described in further detail in copending application entitled SUBSYSTEM APPLICATION NOTIFICATION METHOD IN A CENTRALIZED ROUTER DATABASE, filed Oct. 12, 1999 and is incorporated herein by reference.

On the other hand, if the constantly changing data is stored outside (externally) of the centralized database, subsystem applications may become aware of the other applications storing the external data, which may cause the system to become dependent upon these other applications, and therefore cause the system to be non-modular.

Accordingly, there is a need for a method and system for externally managing router configuration data in conjunction with a centralized database which allows the various subsystems of the IOS to be modular and independent. The present invention satisfies these needs, as well as others, and generally overcomes the deficiencies found in the background art.

An object of the invention is to provide a method and system for externally managing router configuration data which overcomes the prior art.

Another object of the invention is to provide a method and system for externally managing router configuration data in conjunction with a centralized database system.

Another object of the invention is to provide a method and system for externally managing router configuration data which does not require multiple dependencies between subsystem applications of the router.

Another object of the invention is to provide a method and system for externally managing router configuration data which allows the subsystem applications of the router to be modular and independent of each other.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and system for managing data externally in conjunction with a centralized information provider or database system. The method of the invention is provided by operating system software which is run or otherwise executed on the routing device (router). The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

In its most general terms, the method of the invention comprises software routines and algorithms which are generally provided as part of an operating system which is executed in a router device. The operating system software which is also known as internetwork operating system (IOS) comprises a plurality of subsystems, each of which perform functions for the router.

One of the subsystems provided by the IOS is a centralized database system (sysDB). The sysDB executes as a subsystem component in the router and provides a centralized storage and retrieval facility for configuration information required by other subsystems of the IOS. The configuration information stored on the sysDB may include, for example, Internet protocol (IP) addresses, Ethernet configurations, subnet masks, default routes, protocol configuration, name server information, user and password data, access levels, and other router data as is known in the art. As noted above, prior art router implementations have required the individual subsystems to handle storage and retrieval of configuration information related to the corresponding subsystem (i.e., IP subsystems contained IP configuration data, AAA subsystems contained user authentication information). The present invention employs a centralized sysDB which handles storage and retrieval tasks normally assigned to various subsystems. By centralizing such configuration information in a sysDB, multiple dependencies between the other individual subsystem are avoided or greatly reduced. This arrangement allows the subsystem design and implementation to be modular. Subsystems may be added and removed with greater ease due to the lack of multiple and prevalent dependencies.

According to another aspect of the sysDB, certain router configuration information (such as fast changing data or large amounts of data, for example) may be managed externally from the sysDB in one of the other client subsystems. For example, network interface statistic counter information may be managed by the interference management subsystem. Modularity and independence is provided by allowing the externally maintained data to be retrieved from the sysDB, rather than through the externally managing subsystem, as described further below.

The sysDB subsystem preferably employs a hierarchical name space scheme in a tree format (sysDB tree) for data storage and retrieval of configuration and other information for the router. Each branch or leaf on the tree is treated as a node or a "tuple". In an illustrative example, the sysDB tree employs a naming convention analogous to the UNIX® file system where intermediate nodes of the tree are analogous to UNIX® directories and where leaf nodes are treated as files and data which are associated with the files. In the preferred embodiment, each node or tuple in the sysDB tree has a pointer to its parent node, a pointer to its next peer, and a pointer to its first child. With this arrangement, all the children of a tuple can be iterated by using the first child as the head of a link list and traversing through the corresponding peer of each child. While the sysDB described above employs a tree structure for data storage and retrieval, other data storage facilities known in the art may be utilized including, for example, a table, b-tree or relational table scheme without deviating from present invention disclosed herein.

The sysDB subsystem is operatively coupled to the other subsystems of the IOS for providing transactional services. An illustrative IOS may include an Internet protocol (IP) subsystem, an Ethernet subsystem, a dialer subsystem, a point-to-point (PPP) subsystem, an authentication (AAA) subsystem, and a config subsystem, each subsystem operatively coupled to the sysDB subsystem, but not coupled to each other. As is known in the art, the IP subsystem manages the Internet addresses for various port facilities on the router; the Ethernet subsystem manages the Ethernet port facilities on the router; the dialer subsystem manages the dial-in communication access; the PPP subsystem manages the point to point protocol functions on the router; the AAA subsystem manages the user authentication process on the router; and the config subsystem provides configuration management for the router.

The sysDB further includes an external managing unit coupled for communication to the sysDB tree and to other subsystems which provide router configuration data externally. The external managing unit carries out the operating of registering and unregistering subsystems for external data managing services. The external managing unit further carries out the operation of providing transaction access to such externally managed data to client subsystems requesting such data.

Managing subsystems (which provide configuration data externally from the sysDB) further include a local managing unit coupled for communication to the external managing unit of the sysDB and a local data store. The local managing unit is coupled to the local data store for managing the external router data within the local data store and providing the router data to the external managing unit of the sysDB upon request. The local managing unit also carries out the operation of registering and unregistering with the sysDB for external data managing services.

A managing subsystem registers for external data managing services with the sysDB by transmitting a "managing" registration request. The managing subsystem may register to externally manage router configuration data which would otherwise be maintained within the sysDB tree. Accordingly, the managing subsystem may register to externally manage an individual tuple of the sysDB tree or an entire sub-tree (or namespace) of the sysDB tree. Upon registering, the subsystem indicates whether the externally managed data may be "cached" (locally copied) in the sysDB tree, in which case the managing subsystem may further indicate when the cached data expires (timeout) or may later invalidate the cached data. The managing subsystem further indicates a lookup address (or function) from which the sysDB may obtain the externally managed data from the managing subsystem.

When a request is made to the sysDB for data which is externally managed, the sysDB provides the requested data from the cache if the data is resident in the cache and the data has not expired (or otherwise been invalidated). For other data (non-cached or expired data), the sysDB accesses the lookup address (or function) to provide the data value requested by the requesting subsystems.

It is noted that according the present invention, router configuration data is requested from the sysDB by requesting subsystems, thus providing independence between the various subsystems of the IOS. That is, requesting subsystem do not request data from managing subsystems, but rather from the sysDB. However, by providing a method and apparatus for externally managing data as described herein, the disadvantages associated a centralized database (such overhead with fast changing or large data, for example) can be avoided or otherwise reduced.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown FIG. 1 through FIG. 4 and the method outlined in FIG. 5 through FIG. 8. It will be appreciated that the apparatus may vary as to configuration and as to details of the parts, and that the method may vary as to details and the order of the actions, without departing from the basic concepts as disclosed herein. The invention is disclosed generally in terms of a method and system for carrying managing external router data in conjunction with a centralized database, although numerous other uses for the invention will suggest themselves to persons of ordinary skill in the art.

Figure 1:
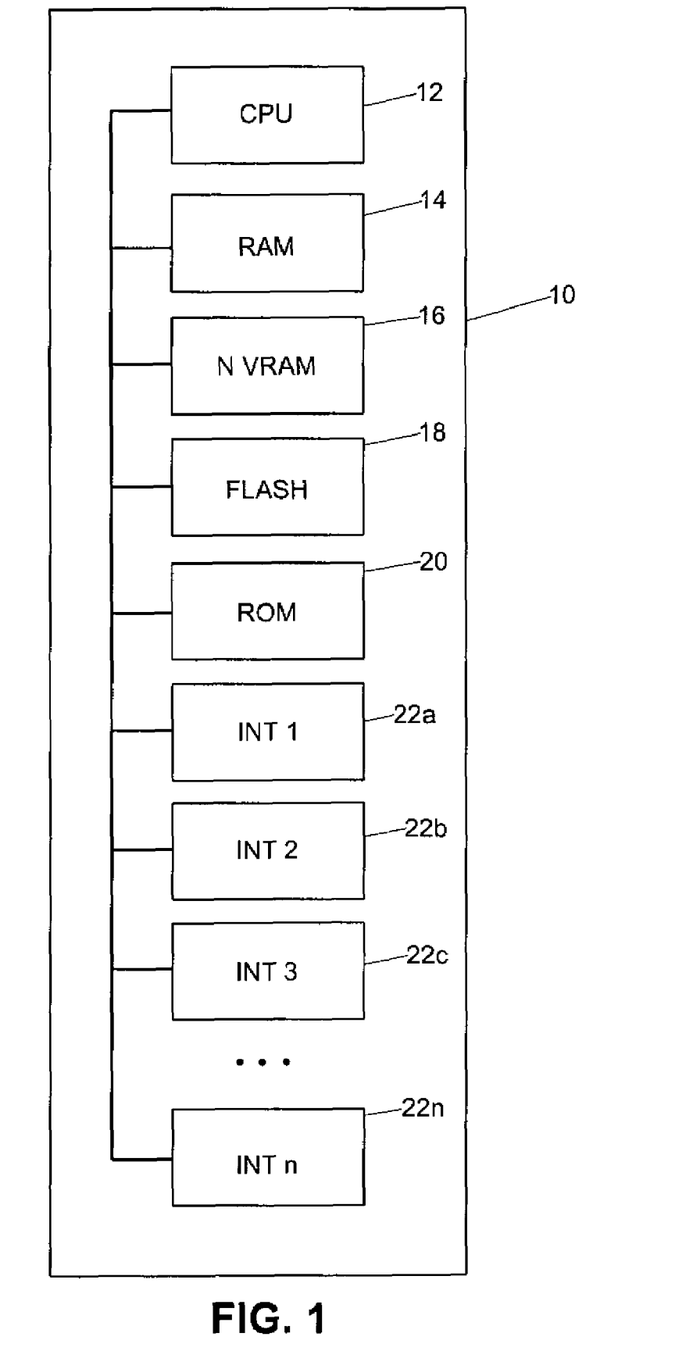
FIG. 1 is a block diagram of a router device suitable for use with the present invention.

Referring first to FIG. 1, there is shown generally a block diagram of a router device 10 suitable for use with the present invention. The router device 10 includes circuitry or like hardware components well known by those in the art and comprises a CPU 12, random access memory (RAM) 14 operatively coupled to the CPU 12, non-volatile memory (NVRAM) 16 operatively coupled to the CPU 12, flash memory (FLASH) 18 operatively coupled to the CPU 12, and read-only memory (ROM) 20 operatively coupled to the CPU 12.

The router device 10 further includes a plurality of interface facilities (INT) 22a through 22n, each of which are operatively coupled to the CPU 12. The interface facilities (INT) 22a through 22n comprise typical ports known in the art which connect to external input/output (I/O) devices. For example, INT 22a may comprise a console port, INT 22b may comprise an Ethernet port, INT 22c may comprise an auxiliary port, and INT 22d may comprise a serial port. Various other port configurations as is known in the art may be arranged without deviating from the present invention.

The CPU 12 carries out the computational tasks associated with executing and running the internetwork operating system (IOS) software of the present invention and comprises circuitry or other hardware as is known in the art. In one exemplary embodiment, the CPU 12 comprises a MIPS R4000 CPU.

The RAM 14 may comprise random access memory or dynamic random access memory. The RAM 14 provides the main storage component for the router 10. The RAM 14 is also referred to as working storage and contains the running configuration information of the router which is managed by the system database (sysDB) as described in further detail below. RAM 14 is volatile memory as is lost when power is interrupted to the router 10.

The NVRAM 16 normally contains a persistent copy of the configuration information of the router. The configuration information includes, among other things, statements about router-specific attributes, protocol functions, and interface addresses. If power is interrupted to the router 10, the persistent copy of the configuration is provided to the router to provide normal routing operation without the need for reprogramming or reconfiguring.

The FLASH 18 is an erasable, programmable read-only memory which contains the internetwork operating system (IOS) software of the router 10. As is known in the art, flash memory has a structure that enables the flash to store multiple copies of the IOS software. Flash memory content is retained when power is interrupted from the router or the router is restarted.

The ROM 20 contains an initializing bootstrap program and is used during initial start up of the router 10. The ROM 20 usually carries out a power-on self-test (POST) to check the hardware components of the router 10 as is known in the art.

During start up, the router 10 conducts the POST check routine which is provided by the ROM 20. The POST check includes a diagnostic which verifies the basic operation of the CPU 12, the RAM 14, the NVRAM 16, the FLASH 18, and interface circuitry 22a through 22n. At the conclusion of the POST, the router 10 loads the IOS software from the FLASH 18 into the RAM 14. It will be appreciated that IOS software may be loaded using a variety of methods without deviating from the present invention including, for example, loading the IOS from an external source such as a TFTP server. The router configuration information is then loaded into RAM 14 from the NVRAM 16. More particularly, the configuration information is loaded into the database system in RAM 14. The configuration information for the router may also be loaded into RAM 14 using other means known in the art. The CPU 12 then proceeds to carry out the tasks required by the IOS.

Figure 2:
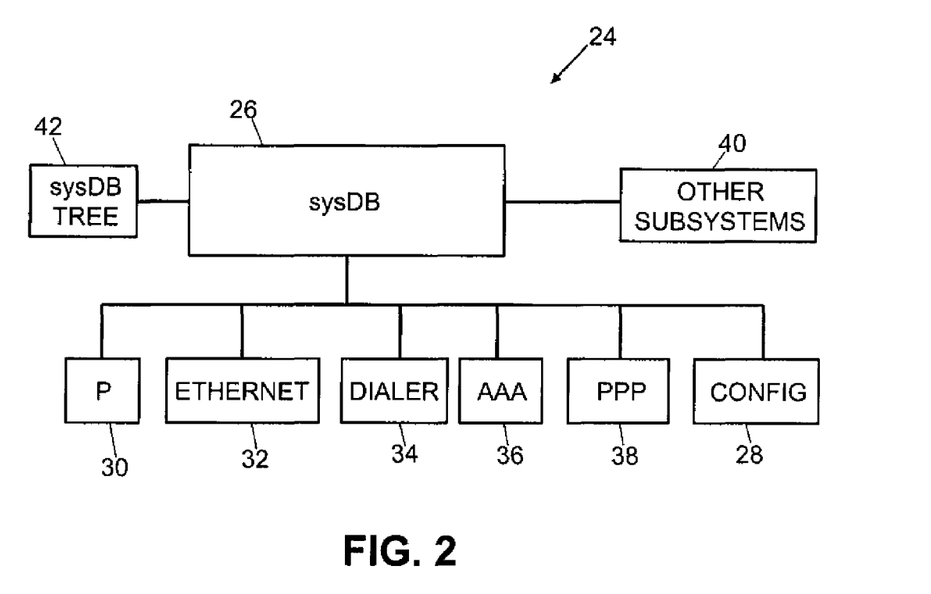
FIG. 2 is a block diagram of an internetwork operating system in accordance with the present invention.
Figure 3:
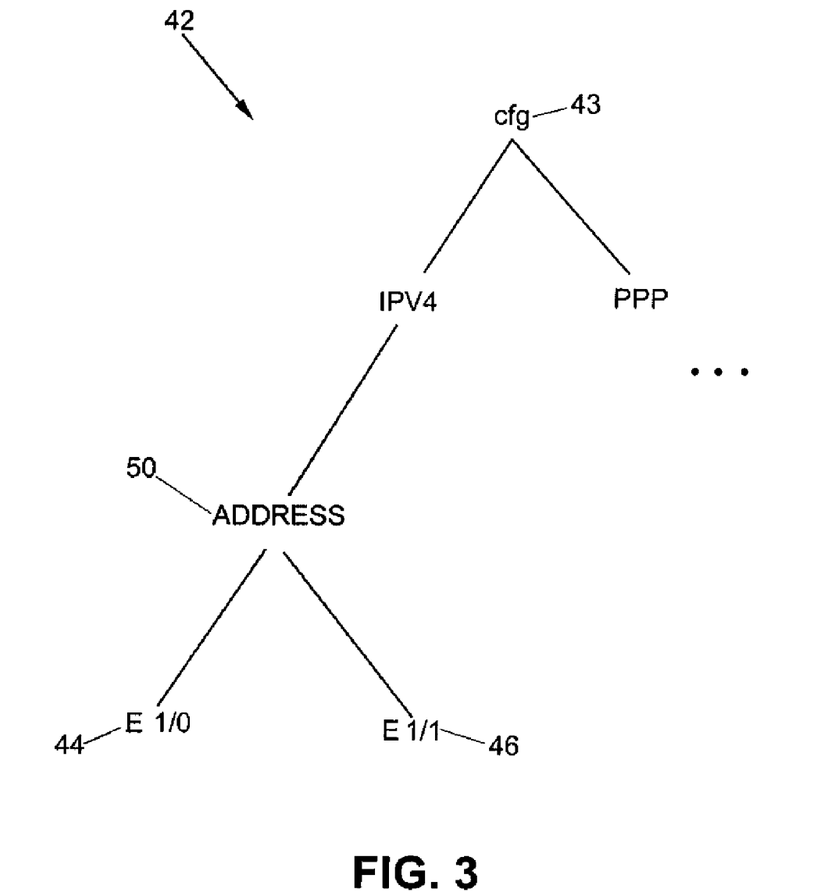
FIG. 3 is a block diagram of an exemplary tree structure for data storage suitable of use with the present invention.

Referring next to FIG. 2, there is shown a block diagram of an internetwork operating system (IOS) 24 in accordance with the present invention. The IOS 24 which is stored in the FLASH 18 provides the software functions and routines executed by the CPU 12 for the router device 10. The method of the present invention is preferably incorporated into the IOS software device and is executed by the CPU 12. FIG. 3 depicts a block diagram of an exemplary tree structure 42 for data storage which is used in conjunction with the IOS 24 as described herein.

The IOS 24 comprises a plurality of subsystem applications which are executed by the CPU 12 and are loaded and resident in RAM 14. The IOS 24 includes a system database (sysDB) 26 subsystem, a config subsystem 28 coupled to the sysDB 26, an Internet Protocol (IP) subsystem 30 coupled to the sysDB 26, an Ethernet subsystem 32 coupled to the sysDB 26, a dialer subsystem 34 coupled to the sysDB 26, an authentication (AAA) subsystem 36 coupled to the sysDB 26, and a point-to-point protocol (PPP) subsystem 38 coupled to the sysDB 26. It will be appreciated that the configuration shown for IOS 24 is only exemplary and various arrangements of subsystems as known in the art may be used with the method of the present invention. Thus, other subsystems 40 may be coupled to the sysDB 26 to provide additional functions. For example, a SONET subsystem may be coupled to the sysDB 26 to provide optical services.

The sysDB 26 manages a centralized database coupled therewith which is shown and generally designated as sysDB tree 42. The centralized database (sysDB tree 42) may comprise any data storage structure known in the art, and is preferably structured and configured as a tree format (FIG. 3). The sysDB tree 42 contains the running router configuration information used by the various subsystems to carry out their respective tasks.

The sysDB tree structure includes a plurality of branches and leaves which stem from the root configuration (cfg) 43, wherein each branch or leaf is treated as a node or "tuple". For example, FIG. 3 shows a portion of a sysDB tree 42 which includes seven (7) tuples for accommodating router configuration data. For example, Ethernet (E) 1/0 tuple 44 contains Internet address information for Ethernet Port 0 (not shown), and Ethernet (E) 1/1 tuple 46 contains Internet address information for Ethernet Port 1 (not shown). Each tuple includes a first "current" field for storing a current or "default" value associated with configuration information related to the tuple and a second "old" field for storing an "old" configuration value for the tuple. As described further below, the "old" field at a tuple will contain a value when a transaction is currently active on that tuple. When the "old" field value is empty or NULL at a tuple, a transaction is not associated with that tuple.

In certain cases, a plurality of values may be stored at a given tuple by providing an array of fields wherein each field of the array may accommodate a certain value. Other data structures for storing data at a tuple may also be implemented at a tuple without deviating from the present invention.

For router configuration data which is managed externally, the related tuple of the sysDB tree 42 may contain a cached (or local copy) of the external data. In such case, additional data may be provided at the tuple including a timeout period, after which the cached data becomes invalid, and must be "refreshed" (i.e., re-obtained from the managing subsystem). By caching the external data, performance of the sysDB can be improved at the cost of slightly stale data. Additional data provided at the tuple may also include an address (or function) from which the sysDB may obtain the external data from the managing subsystem.

In the preferred embodiment, each node or tuple in the sysDB tree has a pointer to its parent node, a pointer to its next peer, and a pointer to its first child. Thus, E 1/0 tuple 44 has a pointer to Address tuple 50 and to E 1/1 tuple 46. With this arrangement, all the children of a tuple can be iterated by using the first child as the head of a link list and traversing through the corresponding peer of each child.

The config subsystem 28 carries out the operation of receiving configuration commands for a user of the router, executing the configuration command received from the user and providing configuration information to the user of the router upon request from the user, among other things. As described above, this router configuration information is stored and managed by the sysDB 26 in the sysDB tree 42.

The IP subsystem 30 carries out the operation of providing wide-area connectivity using a set of protocols associated with Internet Protocol (IP). As is known in the art, the IP subsystem provides packet filtering and forwarding functions for the IP protocol.

A connector device (not shown) may be provided as one of the interface facilities 22a through 22n to connect Ethernet facilities to the router 10. The Ethernet subsystem 32 carries out the operation of providing packet filtering based on Ethernet MAC (Layer 2) or IP (Layer 3) addresses as is known in the art and packet forwarding as is known in the art.

The dialer subsystem 34 carries out the operation of providing dial-in connection services to a user of the router.

To this end, the dialer subsystem initiates terminal reception of a user's access credentials, normally in the form of a name and a password.

The AAA subsystem 36 carries out the operation of authenticating the access credentials of users of the router. The AAA subsystem 36 verifies the name and password of the user, which is obtained from the dialer subsystem 34 and determines configuration data for the user as well as access privileges. Configuration data may include such information as the user's IP address, for example. The configuration data for the user is stored in the sysDB tree 42 by sysDB 26 via a transaction request from the AAA subsystem 36.

The PPP subsystem 38 carries out the operation of providing Point-to-Point protocol services over a point-to-point link. As an aspect of providing Point-to-Point protocol services, the PPP subsystem 38 provides a method of encapsulating multi-protocol datagrams into an encapsulated protocol, provides a Link Control Protocol (LCP) which establishes, configures and test the point-to-point link, and provides a Network Control Protocol (NCP) using the encapsulated protocol, which is normally IP.

The sysDB 26 further includes an iterating function (not shown) for navigating to a particular tuple within the sysDB tree 42. A tuple iterator is created for traversing the sysDB tree 42 and is destroyed after completion of its traversal operation. Preferably a tuple iterator does not lock any of the tuples over which it traverses.

Figure 4:
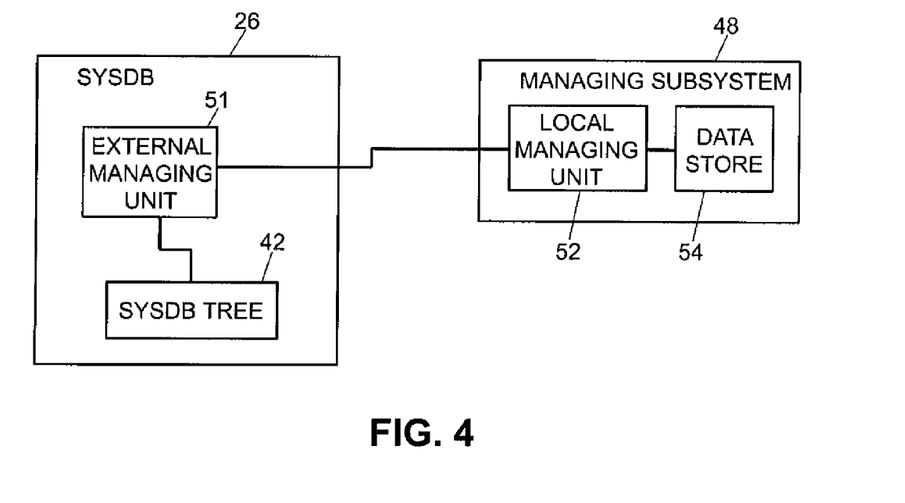
FIG. 4 is a block diagram depicting the relationship between a managing subsystem and the sysDB.

Referring now to FIG. 4, there is shown a block diagram generally depicting the relationship between a managing subsystem 48 and the sysDB 26 according to the present invention. A managing subsystem 48 is a subsystem of the IOS which carries out the operation of externally managing router configuration data as described herein.

As depicted, sysDB 26 further includes an external managing unit 51 coupled for communication to the sysDB tree 42. The external managing unit 51 is further coupled for communication to a managing subsystem, if any. FIG. 4 depicts a single managing subsystem 48 coupled to the external managing unit 51, although one or more other managing subsystems may also be coupled to the external managing unit 51 as described herein for the managing subsystem 48. The external managing unit 51 carries out the operating of registering and unregistering managing subsystems (such as subsystem 48) for external data managing services. The external managing unit 51 further carries out the operation of providing transaction access to such externally managed data to client subsystems (not shown) requesting such data.

Managing subsystem 48 includes a local managing unit 52 coupled for communication the external managing unit 51 of the sysDB 26 and a local data store 54. The local managing unit 52 is coupled to the local data store 54 for managing the external router data maintained within the local data store 54 and providing the router data to the external managing unit 51 of the sysDB 26 upon request. The local managing unit 52 also carries out the operation of registering and unregistering with the sysDB 26 for external data managing services.

In operation, the one or more managing subsystem applications (such as subsystem 48) may register for external data managing services with the sysDB subsystem 26. During the registration, the subsystem identifies the tuple for which the subsystem is registering for external management. The system may also identify a name space (i.e., the sub-tree of a tuple) for which the subsystem would like to provide external management.

Upon registering, the requesting subsystem 48 indicates whether the externally managed data may be "cached" (locally copied) in the sysDB tree 42, in which case the managing subsystem 48 may further indicate when the cached data expires (timeout). Alternatively, the managing subsystem 48 may, during operation, invalidate the cached data. The managing subsystem 48 further indicates a lookup address (or function) from which the sysDB 26 may obtain the externally managed data from the managing subsystem 48.

When a request is made to the sysDB 26 for data which is externally managed, the sysDB 26 provides the requested data from the cache if the data is resident in the cache and the data has not expired (or otherwise been invalidated). For other data (non-cached or expired data), the sysDB 26 accesses the lookup address (or function) to provide the data value requested by the requesting subsystems.

Figure 5:
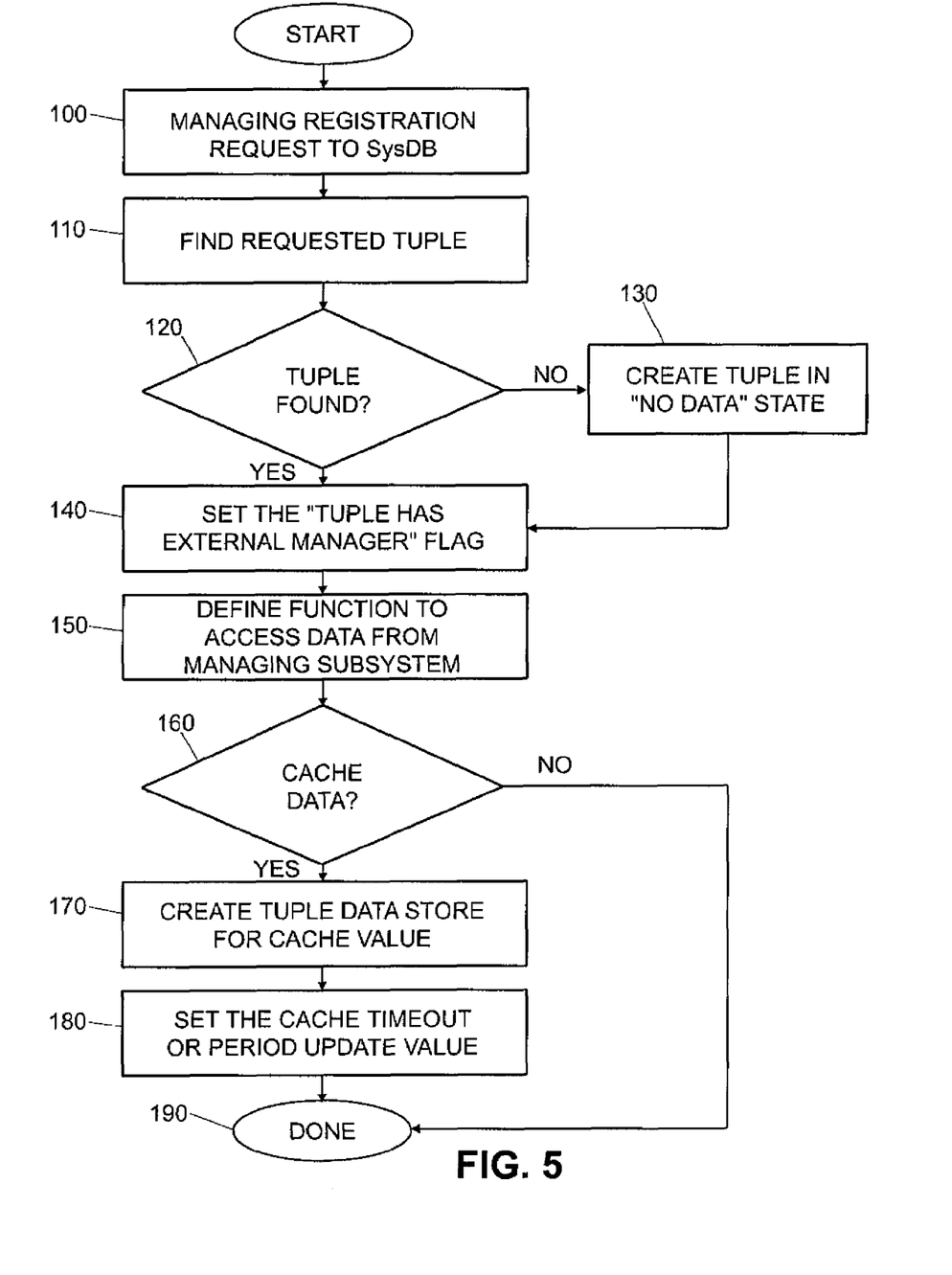
FIG. 5 is a flow chart showing generally the actions involved in registering for external data managing services in accordance with the present invention.
Figure 6:
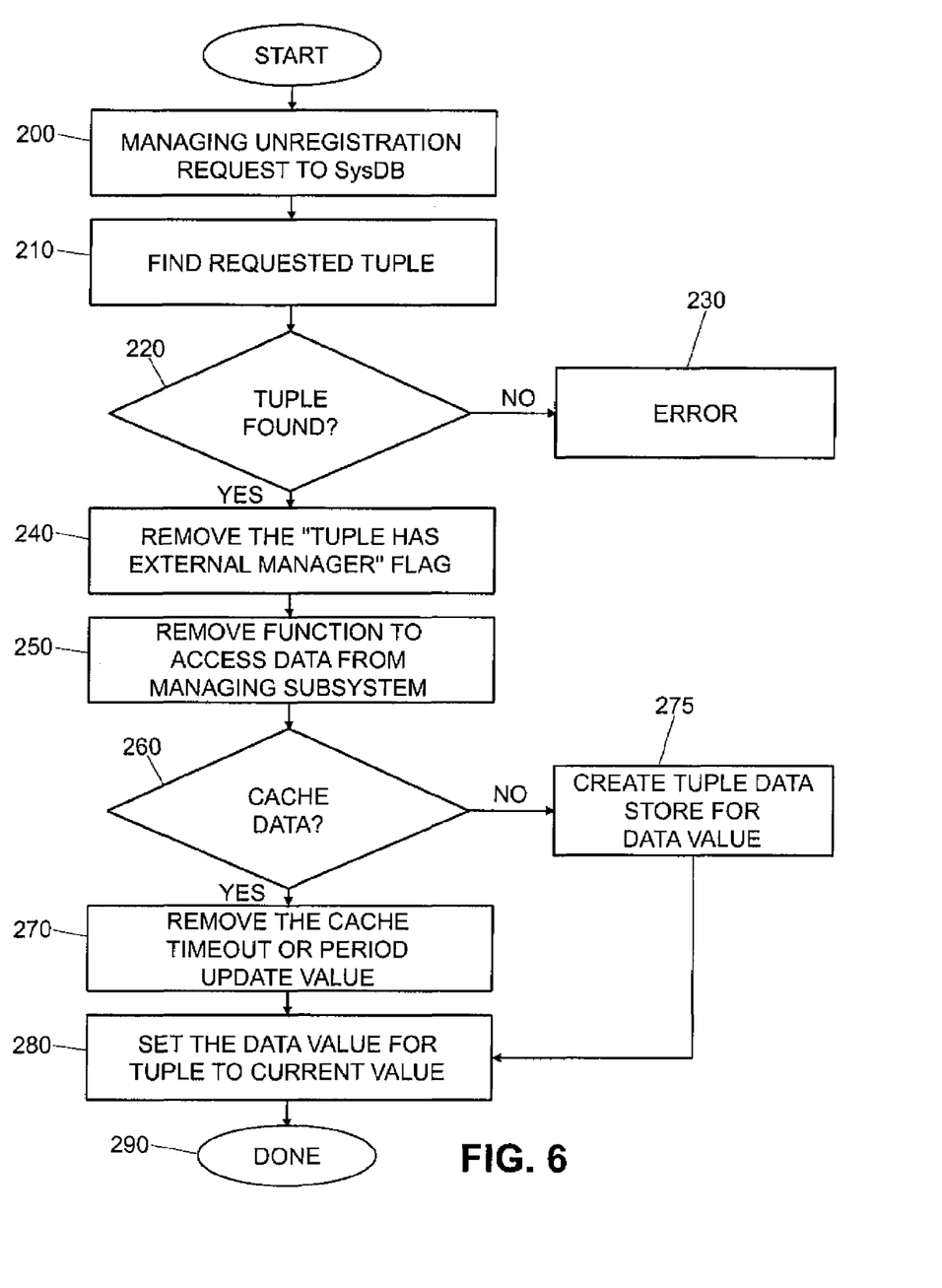
FIG. 6 is a flow chart showing generally the actions involved in unregistering from external data managing services in accordance with the present invention.
Figure 7:
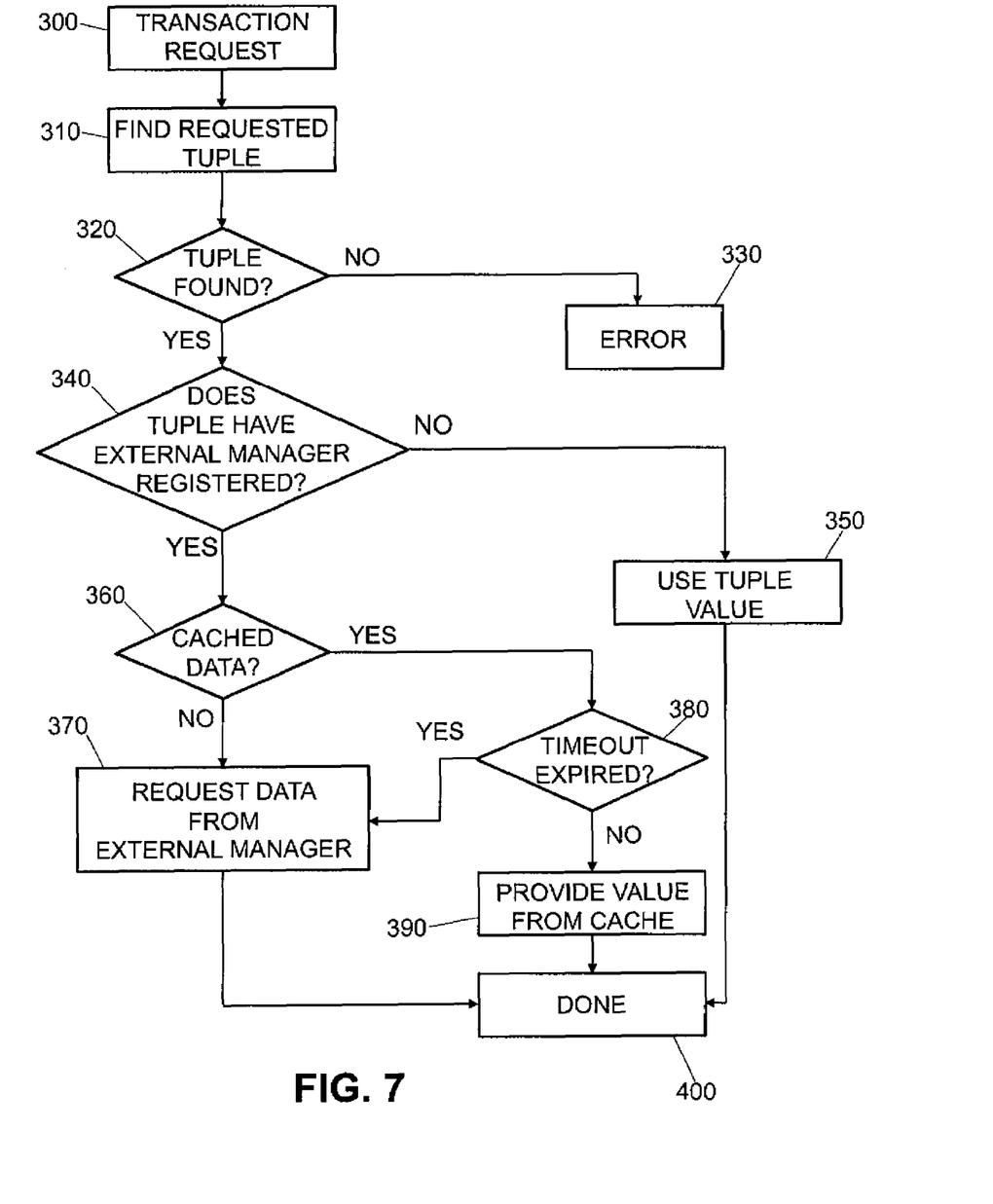
FIG. 7 is a flow chart showing generally the actions involved in handling a request transaction in accordance with the present invention.
Figure 8:
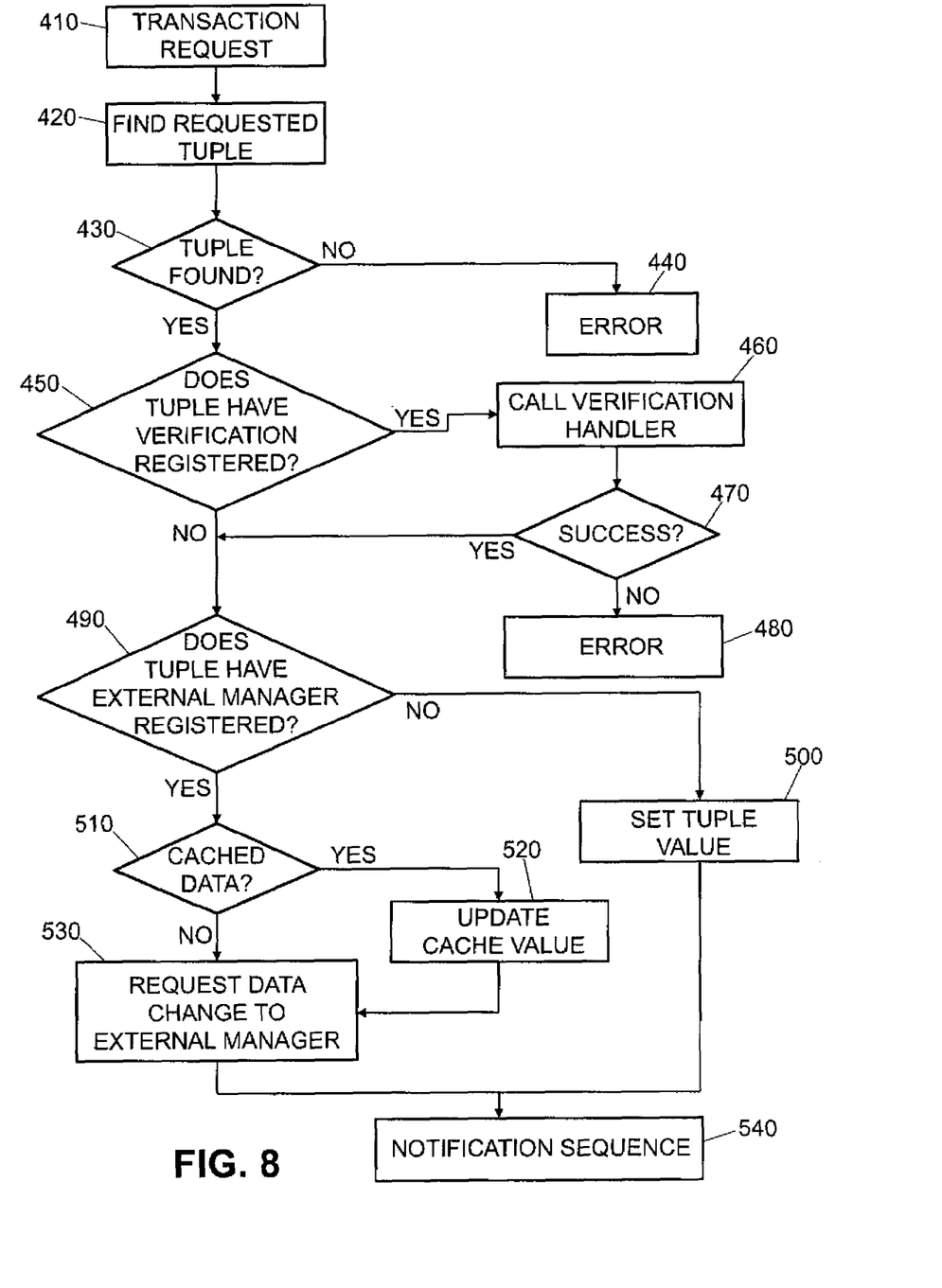
FIG. 8 is a flow chart showing generally the actions involved in handling a change transaction in accordance with the present invention.

The method and operation of invention will be more fully understood with reference to the flow charts of FIG. 5 through FIG. 8, as well as FIG. 1 through FIG. 4. FIG. 5 is a flow chart showing generally the actions involved in registering for external data managing services in accordance with the present invention. FIG. 6 is a flow chart showing generally the actions involved in unregistering from external data managing services in accordance with the present invention. FIG. 7 is a flow chart showing generally the actions involved in handling a request transaction in accordance with the present invention. FIG. 8 is a flow chart showing generally the actions involved in handling a change transaction in accordance with the present invention. The order of actions as shown in FIG. 5 through FIG. 8 and described below is only exemplary, and should not be considered limiting.

Referring now to FIG. 5, as well as FIG. 1 through FIG. 4, there is shown generally the actions associated with registering a subsystem for external data management. Prior to the registration sequence described herein, the managing subsystem 48 creates the data store 54 for storing the externally managed router data. The data store 54 may be any conventional data store (such as table) for storing data as is known in the art.

At box 100, a managing subsystem 48 (via local managing unit 52) issues a management registration request to the sysDB 26 for external management services. This request will indicate, among other things, the configuration data (tuple) for which the managing subsystem 48 is registering external management and whether the subsystem is registering for management of a "name space" which includes the sub-tree data associated with the tuple. Additionally, the managing subsystem 48 indicates an address (or function) from which the sysDB 26 may obtain the external router data maintained by the managing subsystem 48. The managing subsystem 48 may also indicate whether the external data may be cached (or locally copied) to the sysDB tree 42, and a timeout period after which the cached data becomes invalid and must be refreshed by accessing the address (or function) once again. Box 110 is then carried out.

At box 110, the sysDB 26 receives the registration request of step 100. In response to this request, the sysDB 26 calls a tuple iterator function to find the location of the tuple for which registration is requested. The iterator function searches the sysDB tree 42 starting at the root (cfg) 43 to ascertain the location of the requested tuple. Diamond 120 is then carried out.

At diamond 120, the iterator function determines whether the requested tuple was found during the search of box 110. If the tuple is not found, box 130 is carried out. Otherwise, box 140 is carried out.

At box 130, the iterator function was not able to find the requested tuple in the sysDB tree 42. The absence of a tuple indicates that data for that tuple currently is not available. However, since some of the configuration data maintained in the sysDB 26 is generated dynamically during the operation of the router, the tuple may contain configuration data at some later time during the operation of the router. Thus at box 130, a tuple associated with the present registration request is created in the sysDB tree 42. The value for this newly created tuple is not set since data is maintained externally. Box 140 is then carried out.

At box 140, the sysDB 26 registers external management for the requested tuple. The sysDB 26 sets the tuple has external manager flag to indicate the requesting managing subsystem from box 100 will carry out external router data management for the requested tuple. Box 150 is then carried out.

At box 150, the sysDB 26 defines the address (or function) from which the sysDB 26 retrieves the actual value of the router data which is externally managed. The address (or function) is provided by the registration request of box 100 and is set at the requested tuple. Diamond 160 is then carried out.

At diamond 160, the sysDB 26 determines whether the registration request of step 100 included a request to cache the externally managed data within the tuple. If so, box 170 is carried out. Otherwise box 190 is carried out.

At box 170, the sysDB 26 creates a tuple data store for the cache value at the requested tuple. The tuple data store holds the cache value for the externally managed data. Box 180 is then carried out.

At box 180, the sysDB 26 defines the cache timeout value after which the cached value becomes invalid. Alternatively, the managing subsystem 48 may proactively invalidate the cache value. Once the cache value is invalid, the sysDB 26 must request the actual value from the managing subsystem as described further in conjunction with FIG. 7 below. Box 190 is then carried out.

At box 190, the registration is completed. The sysDB 26 will transmit an acknowledgment to the requesting subsystem to indicate that its registration for external management was successful.

Referring next to FIG. 6, as well as FIG. 1 through FIG. 4, there is shown generally the actions associated with unregistering a managing subsystem from external data management. Once a subsystem is unregistered with the sysDB 26, the subsystem no longer carries out external data management of sysDB tree 42 tuple data.

At box 200, a subsystem issues a management unregistration request to the sysDB 26. This request indicates the router configuration data for which unregistration is requested. Box 210 is then carried out.

At box 210, the sysDB 26 receives the unregistration request of box 200. In response to this request, the sysDB 26 calls a tuple iterator function to find the location of the tuple for which unregistration is requested. The iterator function searches the sysDB tree 42 starting at the root (cfg) 43 to ascertain the location of the requested tuple. Diamond 220 is then carried out.

At diamond 220, the iterator function determines whether the requested tuple was found during the search of box 210. If the tuple is not found, box 230 is carried out. Otherwise, box 240 is carried out.

At box 230, the iterator function was not able to find the requested tuple in the sysDB tree 42. The absence of a tuple for unregistration is interpreted as an error because unregistration is proper only when a prior registration was made which would have involved the creation of the requested tuple. Since the iterator function did not find the requested tuple, the unregistration request is improper and an error message is displayed to the user to indicate an unregistration error.

At box 240, the sysDB 26 removes the management registration from the requested tuple by deleting the tuple has external manager flag. Once management registration is removed or otherwise deleted, the requesting subsystem of box 200 will no longer manages router data externally from the sysDB 26. Box 250 is then carried out.

At box 250, the sysDB 26 removes or otherwise deletes the address (or function) from which the sysDB 26 access the externally managed data from the managing subsystem 48. Diamond 260 is then carried out.

At diamond 260, the sysDB 26 determines whether the externally managed data was cached in the requested tuple. If externally managed data was cached, box 270 is carried out. Otherwise, box 275 is carried out.

At box 270, the sysDB 26 has determined that the externally managed data was cached at the requested tuple. The sysDB 26 removes the cache timeout for the requested tuple. Box 280 is then carried out.

At box 275, the sysDB 26 has determined that the externally managed data was not cached at the requested tuple. Since router data will now be managed locally at the sysDB tree 42, storage for tuple data will be required. The sysDB 26 creates a tuple data store for the router value at the requested tuple. Box 280 is then carried out.

At box 280, the sysDB 26 sets the tuple current value to the most recent value for the tuple. Alternatively, the tuple may be set to the "no data" state. Box 290 is then carried out.

At box 290, the unregistration is complete. The sysDB 26 will transmit an acknowledgment to the requesting subsystem to indicate that its management unregistration request was successful.

Referring next to FIG. 7, as well as FIG. 1 through FIG. 4, there is generally shown the actions associated with handling transactions in accordance with the present invention. In the following example, the transaction illustrated is a "tuple query request" where a subsystem is requesting the value of router data from the sysDB 26. FIG. 8 describes a change or modify transaction request further below.

At box 300, a subsystem issues a tuple query request to the sysDB 26. Box 310 is then carried out.

At box 310, the sysDB 26 receives the tuple query request of box 300 and ascertains the location of the tuple in the sysDB tree 42. The sysDB 26 calls a tuple iterator function to find the location of the tuple for which a change is requested. The iterator function searches the sysDB tree 42 starting at the root (cfg) 43 to ascertain the location of the requested tuple. Diamond 320 is then carried out.

At diamond 320, the iterator function determines whether the requested tuple was found during the search of box 310. If the tuple is not found, diamond 340 is carried out. Otherwise, box 330 is carried out.

At box 330, the iterator function was not able to find the requested tuple in the sysDB tree 42. The absence of a tuple for change or update is interpreted as an error because a query transaction at a tuple is proper only if the tuple was previously created. Since the iterator function did not find the requested tuple, the query request is improper and an error message is displayed to the user to indicate a query request error.

At diamond 340, the sysDB 26 determines whether the requested tuple has its "tuple has external manager" flag set. If the "tuple has external manager" flag is set, then a managing subsystem is registered to manage the requested data externally from the sysDB 26. If the "tuple has external manager" flag is set at the requested tuple, then diamond 360 is carried out. Otherwise, box 350 is carried out.

At box 350, external management is not provided at the requested tuple and the transaction is carried out using the method described in copending application entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, which is incorporated herein by reference. In the present example, where the transaction is a query request, the sysDB 26 provides the data from the tuple. Box 440 is then carried out.

At diamond 360, external management is provided at the requested tuple. The sysDB 26 determines whether cached data is provided at the requested tuple. If external data is cached at the requested tuple, then diamond 380 is carried out. Otherwise box 370 is carried out.

At diamond 380, the sysDB 26 determines whether the cached value for the external data is still valid. If the cache timeout has not yet expired, and the managing subsystem 48 has not otherwise invalidated the cache value, then box 390 is carried out to provide the cache value. Otherwise box 370 is carried out.

At box 390, the sysDB 26 has determined that the cache value is still valid and provides this cache value to the requesting subsystem of box 300 in response to the query request. Box 400 is then carried out.

At box 370, the sysDB 26 has determined that either the cache value is invalid or that cache data is not provided at the requested tuple. In either case, the external managing unit 51 accesses the address (or function) from which data may be retrieved from the managing subsystem 48 registered at the requested tuple. The sysDB 26 then provides the ascertained data value to the requesting subsystem of box 300 in response to the query request. Box 400 is then carried out.

At box 400, the request transaction has been completed. The process described herein is carried out for each such request transaction made to the sysDB 26.

Referring now to FIG. 8, as well as FIG. 1 through FIG. 4, there is generally shown the actions associated with handling change or modify transactions in accordance with the present invention.

At box 410, a subsystem issues a tuple query request to the sysDB 26. Box 420 is then carried out.

At box 420, the sysDB 26 receives the tuple query request of box 410 and ascertains the location of the tuple in the sysDB tree 42. The sysDB 26 calls a tuple iterator function to find the location of the tuple for which a change is requested. The iterator function searches the sysDB tree 42 starting at the root (cfg) 43 to ascertain the location of the requested tuple. Diamond 430 is then carried out.

At diamond 430, the iterator function determines whether the requested tuple was found during the search of box 420. If the tuple is not found, diamond 450 is carried out. Otherwise, box 440 is carried out.

At box 440, the iterator function was not able to find the requested tuple in the sysDB tree 42. The absence of a tuple for change or update is interpreted as an error because a change transaction at a tuple is proper only if the tuple was previously created. Since the iterator function did not find the requested tuple, the change request is improper and an error message is displayed to the user to indicate a change request error.

At diamond 450, the sysDB 26 determines whether the requested tuple found in box 420 has verification registrations. If a tuple has verification registrations, subsystems that are registered for "verification" at the tuple must first authorize changes before such changes are permitted. Verification registrations are described in further detail in copending application entitled METHOD AND SYSTEM FOR VERIFYING CONFIGURATION TRANSACTIONS MANAGED BY A CENTRALIZED DATABASE filed on Oct. 12, 1999 which is incorporated by reference herein. If verification registrations exist at the requested tuple then box 460 is carried out. Otherwise diamond 490 is carried out.

At box 460, the sysDB 26 determines that the requested tuple has verification registrations. The sysDB 26 then calls the verification handler routine which either authorizes or denies a change request. The verification handle routine is described further in copending application entitled METHOD AND SYSTEM FOR VERIFYING CONFIGURATION TRANSACTIONS MANAGED BY A CENTRALIZED DATABASE filed on Oct. 12, 1999. Diamond 470 is then carried out.

At diamond 470, the sysDB 26 receives a reply from the verification handler routine. The verification handler will return a "success" reply for authorized changes, or an "error" reply for unauthorized changes. If a "success" reply is issued, diamond 490 is carried out to set the tuple value. Otherwise box 480 is carried out to generate an error message.

At box 480, the verification handler returned an "error" in response to proposed changes. An error message is generated and is displayed to the user.

At diamond 490, the sysDB 26 determines whether the requested tuple has its "tuple has external manager" flag set. If the "tuple has external manager" flag is set, then a subsystem is registered to manage the requested data externally from the sysDB 26. If the "tuple has external manager" flag is set at the requested tuple, then diamond 510 is carried out. Otherwise, box 500 is carried out.

At box 500, external management is not provided at the requested tuple and the transaction is carried out using the method described in copending application entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, which is incorporated herein by reference. In the present example, where the transaction is a change request, the sysDB 26 sets the value at the requested tuple. Box 540 is then carried out to carry out notification sequence.

At diamond 510, external management is provided at the requested tuple. The sysDB 26 determines whether cached data is provided at the requested tuple. If external data is cached at the requested tuple, then box 520 is carried out. Otherwise box 530 is carried out.

At box 520, the sysDB 26 has determined that external management is provided at the requested tuple. To effect the current change request, the sysDB 26 updates the cached value to the requested changed value. Box 530 is then carried out.

At box 530, the sysDB 26 requests a data change to the external managing subsystem to effectuate the change externally. In response to this requests, the managing subsystem 48 updates the local data store 54 to reflect the changed value. Box 540 is then carried out to carry out notification.

At box 540, the sysDB 26 executes the notification routine which notifies registered subsystems of changes made to the requested tuple. Copending application entitled SUBSYSTEM APPLICATION NOTIFICATION METHOD IN A CENTRALIZED ROUTER DATABASE, filed Oct. 12, 1999 describes in further detail the method for carrying out router configuration change notifications in conjunction with a centralized database and is incorporated by reference herein.

Accordingly, it will be seen that this invention provides a method for externally managing router data in conjunction with a centralized database system. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for reducing computational overhead in a centralized database system by externally managing router data in conjunction with a centralized database subsystem, said database subsystem operatively coupled for communication with a plurality of router subsystems one of which is a first managing subsystem, comprising:
   a) transmitting a management registration request by said first managing subsystem to said database subsystem, said registration request indicating router configuration data for which said first managing subsystem is requesting to provide external management services, said router configuration data managed by said database system and derived from configuration commands supplied by a user and executed by a router configuration subsystem before being stored in said database;
   b) receiving said management registration request by said database subsystem; and
   c) registering said first managing subsystem for external management by said database subsystem.

2. The method of claim 1 further comprising maintaining router configuration data using a tree structure having a plurality of tuples by said database system.

3. The method of claim 2 wherein said registering said managing subsystem for external management further comprises:
   (a) finding a requested tuple for which external management is requested; and
   (b) defining an address to access external router data from said first managing subsystem at said requested tuple.

4. The method of claim 3 wherein said registering said managing subsystem for external management further comprises caching said external router data at said requested tuples.

5. The method of claim 1 further comprising:
   a) transmitting a query request for router data by a requesting subsystem to said database subsystem;
   b) receiving said query request by said database subsystem;
   c) determining whether said router data is externally managed by a second managing subsystem;
   d) accessing said router data from said second managing subsystem by said database subsystem when said database subsystem determines said router data is externally managed by a second managing subsystem; and
   e) providing said router data to said requesting subsystem.

6. The method of claim 1 further comprising:
   (a) transmitting a query request for router data by a requesting subsystem to said database subsystem;
   (b) receiving said query request by said database subsystem;
   (c) determining whether said router data is externally managed by a second managing subsystem;
   (d) determining whether said router data is locally cached when said database subsystem determines said router data is externally managed by a second managing subsystem;
   (e) determining whether said cache value is valid when said database subsystem determines said router data is locally cached;
   (f) determining cache value of router data when said cache value is valid; and
   (g) providing said cache value to said requesting subsystem when said cache value is valid.

7. The method of claim 6 further comprising:
   a) accessing said router data from said managing subsystem by said database subsystem when said cache value is not valid; and
   b) said database subsystem providing said router data to said requesting subsystem when said cache value is not valid.

8. The method of claim 1 further comprising:
   (a) transmitting a change request for router data by a requesting subsystem to said database subsystem;
   (b) receiving said change request by said database subsystem;
   (c) determining whether said router data is externally managed by a second managing subsystem; and
   (d) requesting a data change for said router data to said second managing subsystem by said database subsystem when said database subsystem determines said router data is externally managed by a second managing subsystem.

9. The method of claim 8 further comprising:
   a) determining whether said router data is locally cached; and
   b) updating the cache value to said router data when said router data is locally cached.

10. A program storage device readable by a machine, tangibly embodying a program of instructions executable by the machine to perform a method for reducing computational overhead in a centralized database system by externally managing router data in conjunction with a centralized database subsystem, said database subsystem operatively coupled for communication with a plurality of router subsystems one of which is a first managing subsystem, said method comprising:
   (a) transmitting a management registration request by said first managing subsystem to said database subsystem, said registration request indicating router configuration data for which said first managing subsystem is requesting to provide external management services, said router configuration data managed by said database system and derived from configuration commands supplied by a user and executed by a router configuration subsystem before being stored in said database;
   (b) receiving said management registration request by said database subsystem; and
   (c) registering said first managing subsystem for external management by said managing subsystem.

11. The program storage device of claim 10, said method further comprising maintaining router configuration data using a tree structure having a plurality of tuples by said database system.

12. The program storage device of claim 11, wherein said registering said managing subsystem for external management further comprises:
   (a) finding a requested tuple for which external management is requested; and
   (b) defining an address to access external router data from said first managing subsystem at said requested tuple.

13. The program storage device of claim 12, wherein said registering said managing subsystem for external management further comprises caching said external router data at said requested tuples.

14. The program storage device of claim 10, said method further comprising:
   (a) transmitting a query request for router data by a requesting subsystem to said database subsystem;
   (b) receiving said query request by said database subsystem;
   (c) determining whether said router data is externally managed by a second managing subsystem;
   (d) accessing said router data from said second managing subsystem by said database subsystem when said database subsystem determines said router data is externally managed by a second managing subsystem; and
   (e) providing said router data to said requesting subsystem.

15. The program storage device of claim 10, said method further comprising:
   (a) transmitting a query request for router data by a requesting subsystem to said database subsystem;
   (b) receiving said query request by said database subsystem;
   (c) determining whether said router data is externally managed by a second managing subsystem;
   (d) determining whether said router data is locally cached when said database subsystem determines said router data is externally managed by a second managing subsystem;
   (e) determining whether said cache value is valid when said database subsystem determines said router data is locally cached;
   (f) determining cache value of router data when said cache value is valid; and
   (g) providing said cache value to said requesting subsystem when said cache value is valid.

16. The program storage device of claim 15, said method further comprising:
   (a) accessing said router data from said managing subsystem by said database subsystem when said cache value is not valid; and
   (b) said database subsystem providing said router data to said requesting subsystem when said cache value is not valid.

17. The program storage device of claim 10, said method further comprising:
   (a) transmitting a change request for router data by a requesting subsystem to said database subsystem;
   (b) receiving said change request by said database subsystem;
   (c) determining whether said router data is externally managed by a second managing subsystem; and
   (d) requesting a data change for said router data to said second managing subsystem by said database subsystem when said database subsystem determines said router data is externally managed by a second managing subsystem.

18. The program storage device of claim 17, said method further comprising:
   (a) determining whether said router data is locally cached; and
   (b) updating the cache value to said router data when said router data is locally cached.

19. In a router device having a processor and memory, a router operating system executing within said memory comprising:
   (a) a database subsystem;
   (b) a plurality of client subsystems, each operatively coupled for communication to said database subsystem, one of said client subsystems configured as a managing subsystem to externally manage router data upon issuing a management request to said database subsystem; and
   (c) a database operatively coupled to said database subsystem, said database configured to store router configuration data and delegate management of router configuration data to a management subsystem that requests to manage router configuration data, said router configuration data managed by said database system and derived from configuration commands supplied by a user and executed by a router configuration subsystem before being stored in said database.

20. The router operating system of claim 19 wherein said database subsystem is structured and configured as a tree structure having a plurality of tuples.

21. The router operating system of claim 19 wherein said database subsystem further comprises an external managing unit configured to access external router data from said managing subsystem.

22. The router operating system of claim 19 wherein said managing subsystem further comprises:
   (a) a local managing unit; and
   (b) a data store unit structured to store external router data for said managing subsystem, said local managing unit configured to provide external router data from said data store to said database subsystem.

* * * * *